(12) United States Patent
Gupta et al.

(10) Patent No.: US 7,860,838 B2
(45) Date of Patent: Dec. 28, 2010

(54) DYNAMIC HIERARCHICAL DATA STRUCTURE TREE BUILDING AND STATE PROPAGATION USING COMMON INFORMATION MODEL

(75) Inventors: Vinay Gupta, San Jose, CA (US); Sudhir K. Prasad, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/860,943

(22) Filed: Jun. 4, 2004

(65) Prior Publication Data

US 2005/0278354 A1 Dec. 15, 2005

(51) Int. Cl.
G06F 7/00 (2006.01)
G06F 17/00 (2006.01)
(52) U.S. Cl. ..................................... 707/651
(58) Field of Classification Search ................ 700/100; 707/9, 3
See application file for complete search history.

(56) References Cited

U.S. PATENT DOCUMENTS

| 7,095,321 B2 * | 8/2006 | Primm et al. ............... 340/540 |
| 7,275,236 B1 * | 9/2007 | Kabe .......................... 717/106 |
| 7,343,597 B1 * | 3/2008 | Smith ......................... 717/151 |
| 2003/0195885 A1 * | 10/2003 | Emmick et al. ................ 707/8 |
| 2004/0122789 A1 * | 6/2004 | Ostertag et al. ................ 707/1 |
| 2004/0158455 A1 * | 8/2004 | Spivack et al. ................ 704/9 |
| 2004/0181529 A1 * | 9/2004 | Hiltgen et al. ................ 707/9 |
| 2004/0267694 A1 * | 12/2004 | Sakai et al. .................... 707/1 |
| 2005/0086238 A1 * | 4/2005 | Nevin, III .................. 707/100 |
| 2005/0102256 A1 * | 5/2005 | Bordawekar et al. ........... 707/1 |
| 2005/0165749 A1 * | 7/2005 | Mazzagatti et al. ............ 707/3 |
| 2005/0187912 A1 * | 8/2005 | Matsa et al. ................... 707/3 |
| 2005/0198003 A1 * | 9/2005 | Duevel et al. ................. 707/1 |

* cited by examiner

Primary Examiner—Neveen Abel Jalil
Assistant Examiner—Raheem Hoffler

(57) ABSTRACT

A computer implemented method for managing entities in a computer system. The method includes relating the managed entities and sub-entities each with a node into a hierarchical tree structure defined in a common information model with a tree root and child associations, traversing the tree structure until the tree root and all of the child associations are encountered and determining an origination of each managed entity based on the associations encountered for at least one of adding, deleing or revising information associated with the node for dynamically propagating a status of the managed entities of the hierarchical tree structure.

28 Claims, 13 Drawing Sheets

DYNAMIC HIERARCHICAL DATA STRUCTURE TREE BUILDING AND STATE PROPAGATION USING COMMON INFORMATION MODEL

BACKGROUND

Enterprise management is a serious concern for companies that have widespread networks involving different platforms and various hardware and software providers. In many cases, companies that use different platforms superimpose an additional layer of software to manage their networks and rely on the management software provided by the respective manufacturers of the servers and hardware devices.

One solution is to use a Common Information Model ("CIM"), which was developed by a computer-industry consortium called the Distributed Management Task Force ("DMTF"). CIM was designed to facilitate uniform representation of computer-system objects in various operating systems. CIM is a model that defines the components of a computing environment in terms of objects. DMTF has developed a standardized object model for enterprise management using CIM. In this scenario, CIM allows managed components from different vendors to be controlled by a single application.

One of the major challenges a management application faces is to provide a tree of managed entities that pertains to the specific management function being performed. Most of the management applications provide a static tree architecture which is not usually helpful for all application users. Once the tree is made, state propagation is problematic too. This is because at any given point in time a user is typically provided with only some of the nodes in the tree. As such, while the tree is completely collapsed, there is generally no way of knowing what is going on with the individual nodes. For a management application where the tree nodes are managed entities, not propagating the state up the tree may prove to be catastrophic to the health of the systems or networks being monitored. Although the CIM environment provides several associations that are inherently hierarchical in nature, even if a management application chooses to use these hierarchical associations to make a tree of the managed entities, the tree is not general purpose and does not suit all the functions performed by the application. The CIM model relies upon prior platform specific knowledge to maintain logical hierarchies of objects that requires code changes in the management application as the platform specific hierarchies are changed, and as new platform support is added. The CIM model also does not provide a general purpose way for a client to register for events occurring in the system. It also lacks a general purpose recovery action mechanism.

SUMMARY

An embodiment of the invention is a computer implemented method for managing entities in a computer system. The method includes relating the managed entities and sub-entities each with a node into a hierarchical tree structure defined in a common information model with a tree root and child associations, traversing the tree structure until the tree root and all of the child associations are encountered and determining an origination of each managed entity based on the associations encountered for at least one of adding, deleting or revising information associated with the node for dynamically propagating a status of the managed entities of the hierarchical tree structure.

BRIEF DESCRIPTION OF THE DRAWINGS

The present invention can be further understood by reference to the following description and attached drawings that illustrate the embodiment(s). Other features and advantages will be apparent from the following detailed description of the embodiment(s), taken in conjunction with the accompanying drawings, which illustrate, by way of example, embodiments of the invention.

DETAILED DESCRIPTION OF THE EMBODIMENTS

Figure 1:
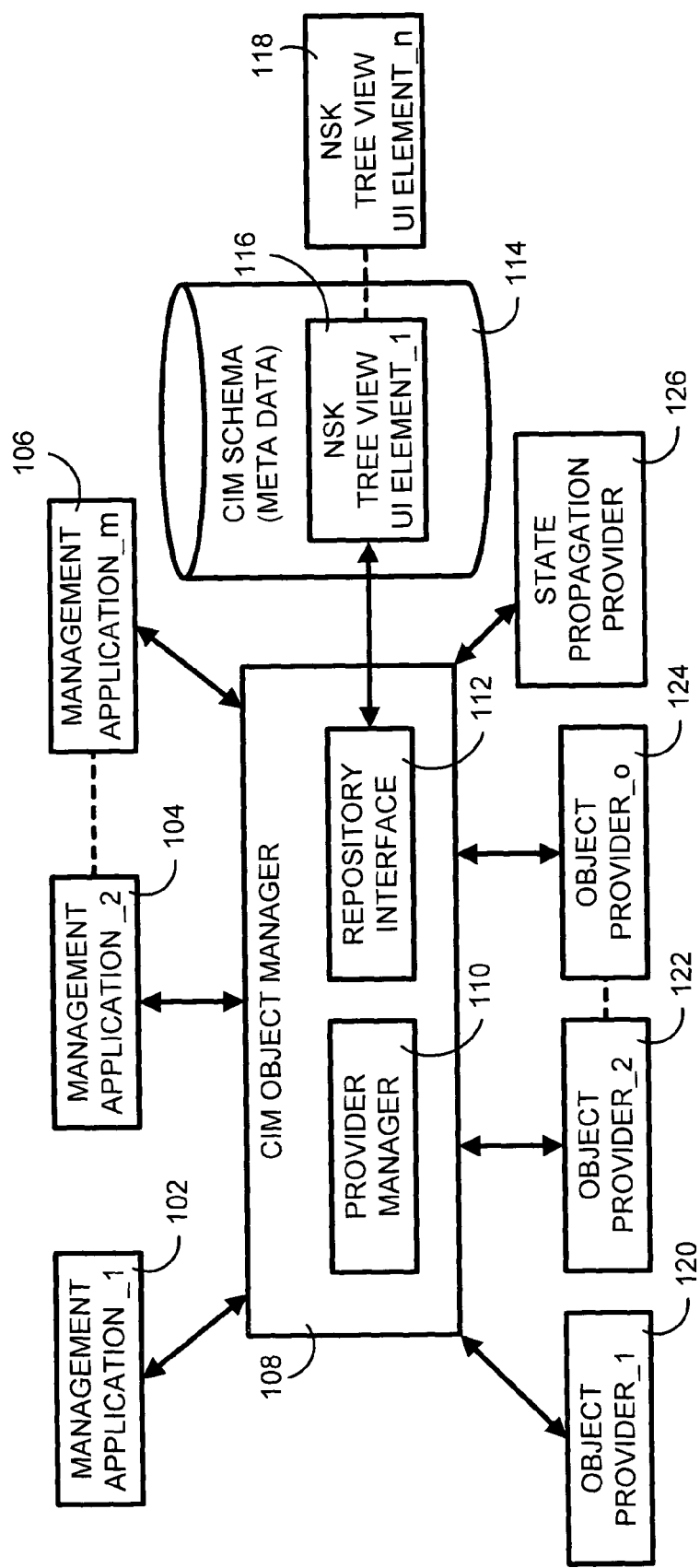
FIG. 1 illustrates one embodiment of the dynamic tree building and state propagation of the present invention using Common Information Model ("CIM").

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. General Overview:

The embodiments of the present invention are operational in a Common Information Model (CIM) environment, but they can operate in any other suitable environment. CIM allows managed components from different manufacturers to be controlled by a single application. For instance, CIM allows a company that has a server platform made by manufacturer "A" (at a first location) and another server platform made by manufacturer "B" (at another location) to manage the entire network from a single remote client application running. Without CIM, the company would have to manage and monitor each server platform using the particular manufacturer's (A or B) own proprietary tools, which can be confusing and very time consuming. CIM provides companies that use multiple platforms a way to relate and associate management data from diverse sources to create cohesive service-centric views of their enterprise information technology (IT) environments.

In the embodiments of the present invention, an extension of a CIM model is disclosed that provides a consistent way to view, describe, and manage objects. An "object" in this context may be a piece of computer hardware such as a disk drive array. The managed object can include many sub-components such as interface cards, cooling fans, drive assemblies, etc. In the present invention, these objects are hierarchically related and the condition or status of a subcomponent (or child) affects the condition of the higher-level object (or parent). Each object has a number of attributes such as its name, version number, vendor, capacity, error condition, etc. Current CIM models by themselves do not explicitly create tree structures. Thus, one embodiment of the present invention extends the CIM model to organize the managed objects into a dynamic tree structure. The dynamic tree structure is then used to dynamically propagate states of the objects so that the failure of a subcomponent "trickles" up the system to main components. Thus, this dynamic system of the present invention allows a user of a client application to automatically become aware that a managed parent object of a failed subcomponent is affected by the failure of the subcomponent.

In general, in one embodiment of the present invention, the Distributed Management Task Force ("DMTF") CIM model is used for a management application that has a management tree of managed entities to make a hierarchical tree that a client application does not have to change whenever a new object of the computer system is added to, deleted from or revised, which changes the hierarchical structure. Also, in another embodiment of the present invention, state propagation is performed on the tree structure so that all of the clients do not have to implement state propagation. This allows embodiments of the present invention to efficiently allow a management application in a CIM environment of a computer system to provide a dynamically updated tree of managed entities that pertains to the specific management function being performed, without knowing the platform specific internals.

II. Dynamic Tree Building and State Propagation Overview:

FIG. 1 illustrates one embodiment of the dynamic tree building and state propagation of the present invention using a common information model ("CIM"). Management Application_1 102, Management Application_2 104, and Management Application_m 106 represent enterprise management applications that are used in a CIM environment, for example, by technical staff to watch over computer network and system health. Management Application_m 106 represents that any number of management applications can be used under this architecture. For instance, there could be 500 copies of the application running on different computers.

The CIM Object manager (CIMOM) 108 is a computer implemented module, such as software, which functions similarly to an old fashioned switchboard operator. The CIMOM 108 can be programmed to operate in a computer readable medium using computer operable instructions. The CIMOM 108 is the central point of the CIM environment through which various objects, providers, and clients communicate with each other. If a CIM provider, such as a computer processor (CPU), encounters an error, it is typically preprogrammed to send a message to the CIMOM 108 detailing what has happened. The CIMOM 108 uses this message as a basis to look through its own list of client applications for determining which application would be interested in knowing about the failure and then dispatching a message to that effect to the client.

In this case, each client instance can have different requirements for notification. As an example, the enterprise management software running on computer A doesn't need to know about the processor failure, but computer B does. In this case, the CIMOM 108 acts as an overseeing device and determines what messages are going to be sent to which entities in the CIM model. In one embodiment, the CIMOM 108 accepts messages through both Inter-process communication (IPC) and hyper text transfer protocol (HTTP) interfaces to allow the CIMOM 108 to communicate with components that are either running locally or on remote systems. In one embodiment, the messages that are sent back and forth from the CIMOM 108 to the various related processes are encoded in extensible markup language (XML).

Referring to FIG. 1, two subcomponents are shown as a provider manager 110, which handles communications with object provider_1 120, object provider_2 122 and object provider_o (represents any number of instances of object providers) and a repository interface 112, which manages the data elements and classes needed to implement tree building and state propagation routines (to be discussed in detail with reference to FIG. 3). The object providers 120, 122, 124 are software components that provide information about the status of hardware devices, such as disk drives, cooling fans, processors, etc.

A NonStop Kernel (NSK) tree view UI element_1 116 and NSK tree view UI element_N 118 (represents any number of instances of the NSK tree view UI element) are used to create the hierarchical tree structure. The state propagation provider 126 is a software component that supports hierarchical tree building and state propagation capabilities. This is accomplished by manipulating meta data 114 of the NSK tree view UI element_1 116. The meta data 114 is a set of informational data defined in the CIM schema, which is the structure of a database. The meta data 114 describes how and when and by what a particular set of data was collected, and how the data is formatted. The meta data 114 is used for understanding the stored information.

In the architecture of FIG. 1 of the present invention, any number of management applications and object providers can interact without having to be guided by preconceived hard coded rules and hierarchies. For example, a new object provider, such as a tape backup unit, can be added to the hierarchical tree of managed objects without having to change and recompile every 1 to M, 1 to N, and 1 to O. The state propagation provider 126 is also able to work across platforms, and thus, it is not tied to a particular brand of computer running a particular version of an operating system.

With regard to the hierarchical tree structure of the present invention, it looks much like a tree with a main root and then ever smaller branches that end up in a leaf. A corporate organizational chart and a family tree are examples of hierarchical tree structures. For example, in a family tree, each of the people in the family is a "node" and nodes on the same level are "siblings." Further, nodes that have branches leading to other nodes are "parents" to the related "child" nodes. A node that does not have children is often called a "leaf", because it marks the end of the chain. When the tree is traversed from a parent node to a child node, this is referred to as a "level change."

Figure 2:
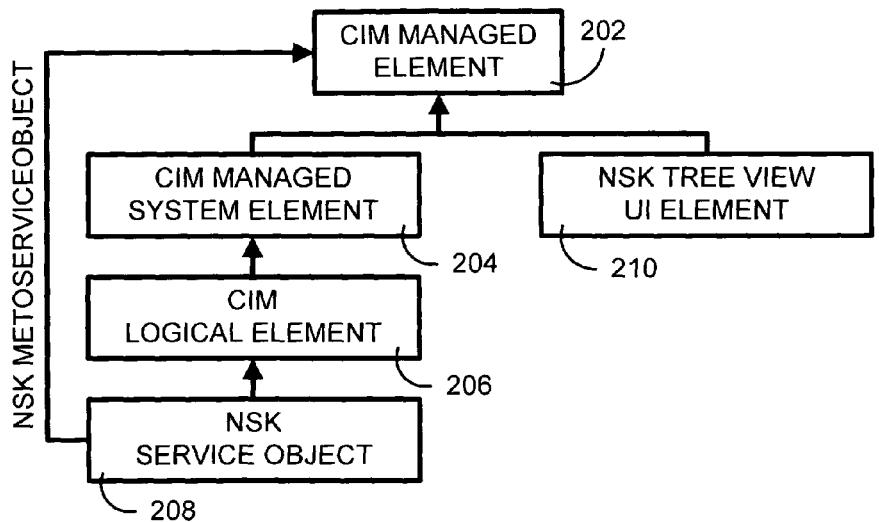
FIG. 2 illustrates one embodiment of the classes used for the dynamic tree building of the CIM environment of the present invention.

III. Dynamic Tree Building Component and Operational Details:

FIG. 2 illustrates one embodiment of the classes used for the dynamic tree building of the CIM environment of the present invention. The classes depicted in FIG. 2 are used to implement the tree building and state propagation routines. The classes include a CIM managed element 202, a CIM managed system element 204, and a CIM logical element 206 of a typical CIM environment. In the hierarchical tree structure of the present invention, each of the nodes is an object of type of the CIM managed element 202 (which is the base class in a CIM model, meaning that a node in an object tree can be of any type). The CIM managed element 202 could be a disk drive, a cooling fan, a server, a database, a user, or any other object defined in the CIM specification. The tree structure of the present invention relates the CIM managed elements 202 into a hierarchical structure.

Many instances of the CIM managed element 202 operate together with an NSK tree view UI element 210, which implements the tree hierarchy, and an NSK service object 208, which keeps track of the error status or "state" of each managed object. The NSK service object is associated with the CIM managed element 202 as a service object association. The NSK tree view UI element 202 is a CIM extension that defines a tree structure in terms of the tree root and the child associations (i.e., the associations that should result in a level change in the tree). In the present invention, numerous tree structures can be defined pertaining to individual application needs. As such, one advantage of the present invention is that the application can build the object tree, traverse through it, and manipulate it, without knowing the internals of the objects.

Figure 3:
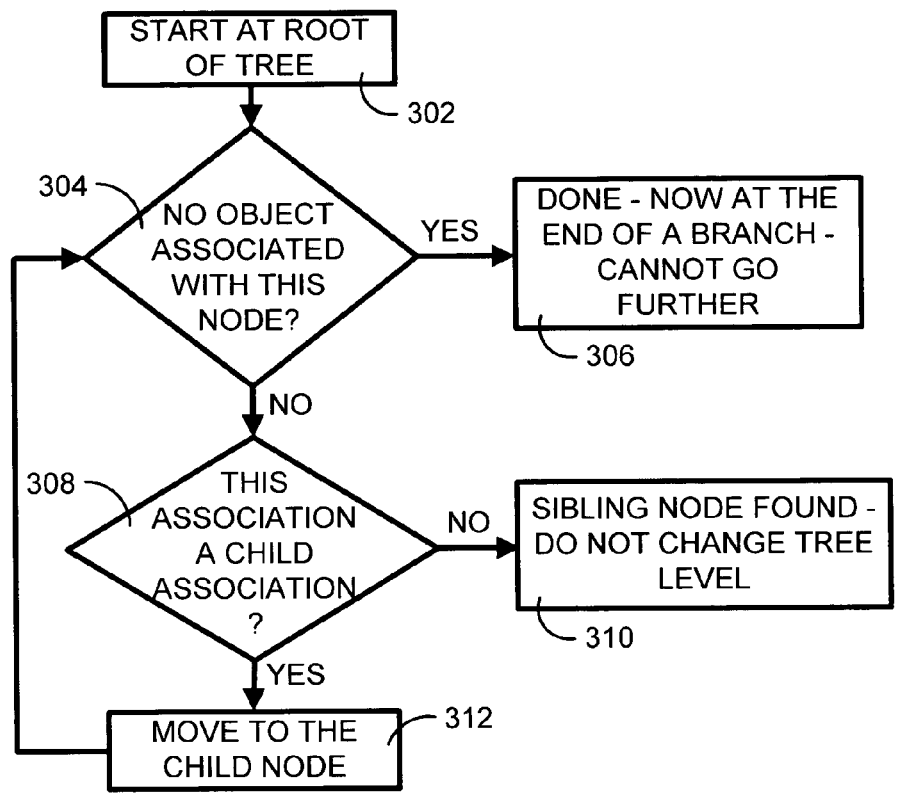
FIG. 3 is a high level flow chart of one embodiment of the dynamic tree building method in the CIM environment of the present invention.

FIG. 3 is a high level flow chart of one embodiment of the dynamic tree building method in the CIM environment of the present invention. The tree structure defined by the NSK tree view UI element 210 is used by a tree-traversing process in a management application to build a dynamic tree of managed objects without having to know the internals of the platform or objects. In general, the tree building process builds the tree structure it is interested in by starting at the tree root instance and then following any associations across the tree. All of the associations that are not listed in the NSK tree view UI element 210 of FIG. 2 as child associations refer to the sibling nodes. Hence, no level change in the tree occurs when such an association is encountered. However, when a child association is encountered, it results in a level change in the tree. This process goes on recursively until no more child associations are encountered for a node. That node, thus, becomes a leaf node.

In order to find these certain nodes of the tree, first, the process starts at the root of the tree (step 302). All the objects associated with this node are then retrieved. If no associations are found (step 304), this indicates that the process is currently at the end of a branch and does not proceed further (step 306). If an association is found, a decision is made as to whether this association is a child association (step 308). If not, a sibling node was found that requires no level change in the tree (step 310). During step 308, if a child association was found, the process moves down to the found children node (step 312). After traversing the children node in step 312, the process returns to step 304 and continues to traverse the tree until the tree is completely built.

Figure 4:
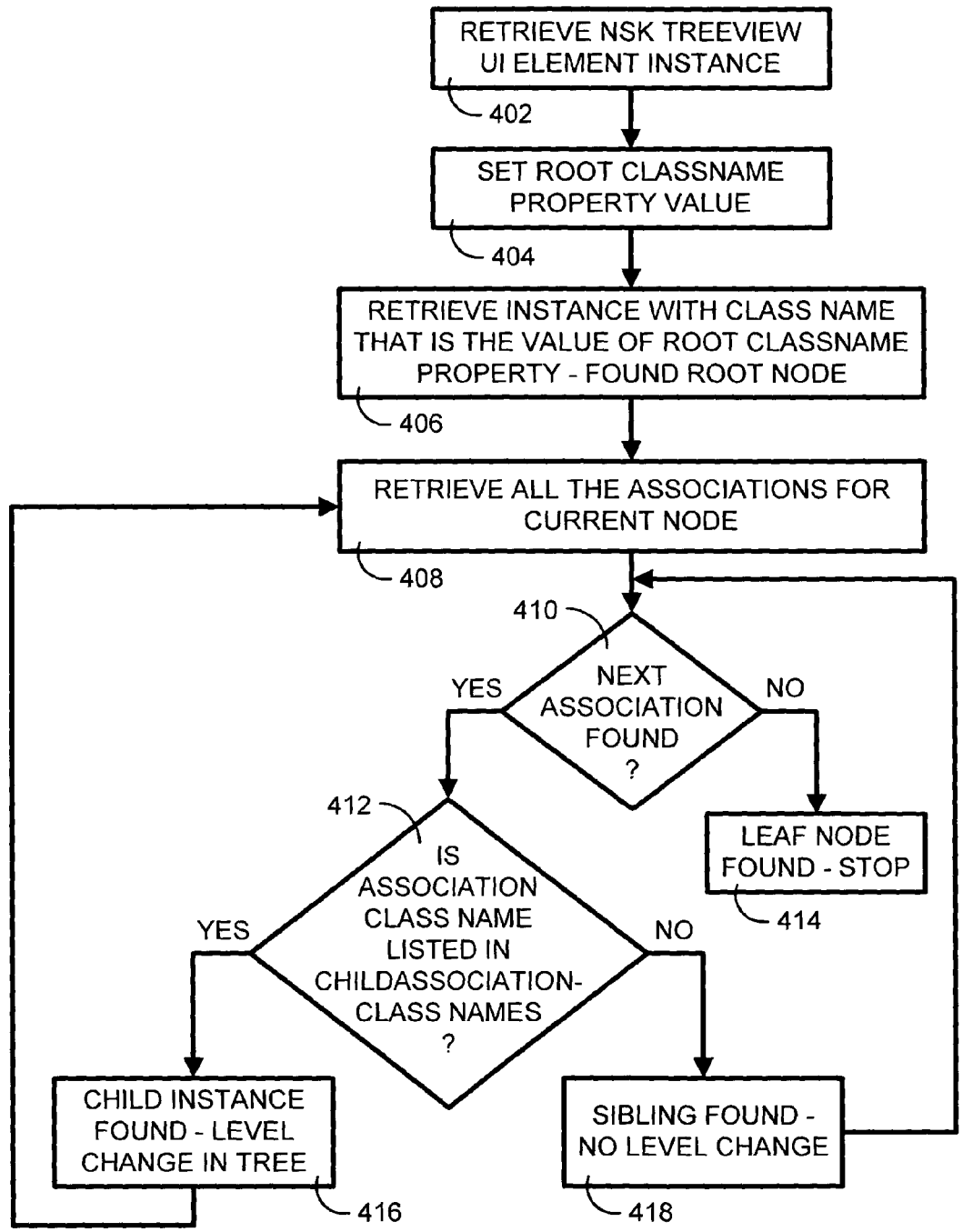
FIG. 4 is a detailed flow chart of one embodiment of the dynamic tree building method in the CIM environment of the present invention.

FIG. 4 is a detailed flow chart of one embodiment of the dynamic tree building method in the CIM environment of the present invention. The tree hierarchy of the present invention is created with the NSK tree view UI elements 210 of FIG. 2. Each of these elements defines a tree structure in terms of the tree root class name that points to the class name of the root of the tree, and the child associations that dictate a level change in the tree. The process starts by retrieving a NSK tree view UI element object (step 402) and finding its root class name (step 404) so that it can find out what object is the starting point (step 406). Once the process finds the root node of the tree, it retrieves all of the associations for that node (step 408).

The process loops through these associations (step 410). When the process runs out of associations, the process stops (step 414). As each association is found, the process compares the association name with the list of child association class names listed in the NSK tree view UI element instance to see if this association indicates that the associated object is a child of the node in question (step 412). If it finds an association that is not a child node, the process deems this node a sibling on the same level of the tree, so the process does not perform a level change (step 418). However, if the process finds a node that is a child of the first node, a level change is made in the tree (step 416) and the process calls the routine recursively (step 408) and makes the child node the new starting point for the process, which continues until the tree is built.

Figure 5:
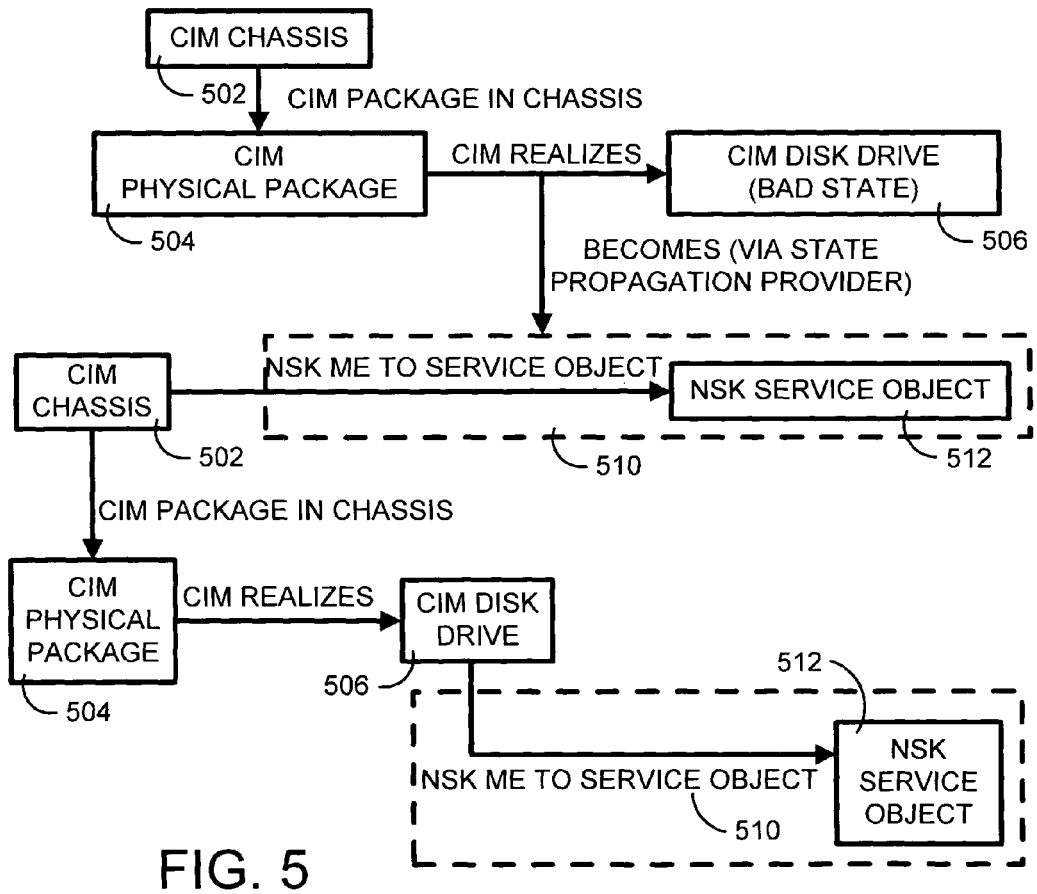
FIG. 5 illustrates one embodiment of the classes used for the dynamic state propagation of the CIM environment of the present invention.

IV. Dynamic State Propagation Component and Operational Details:

FIG. 5 illustrates one embodiment of the classes used for the dynamic state propagation of the CIM environment of the present invention. FIG. 5 shows additional extensions to the CIM model for dynamic state propagation. In general, the extensions include an NSK service object 512 and an NSK (Managed Element) ME to service object 510. The NSK ME to service object 510 serves to relate a CIM managed element 202 of FIG. 2 to its NSK service object 512. The NSK service object 512 keeps track of the status of a CIM managed element 202 of FIG. 2 and its child nodes. For instance, rather than relying on a child node to notify its parents directly of any error conditions, a propagation server traverses the tree in reverse to notify each parent further up in the tree that there is a problem with one of its children by creating NSK service objects 512 and associating them to the CIM managed element 202 of FIG. 2 corresponding to each affected object. It does this by creating the NSK ME to service objects 510.

Namely, FIG. 5 shows the relationship between CIM objects using dynamic state propagation in a computer working environment. In this computer system, FIG. 5 includes a CIM chassis 502, which can represent, for example, a computer chassis that holds a redundant array of independent disks (RAID) disk drive array. The CIM chassis is related to a CIM physical package 504 by a CIM package in chassis association. One CIM physical package 504, which can be the RAID array physical package, contains one CIM disk drive 506. One of the disk drives is failed.

The failed CIM disk drive 506 is notified to the state propagation provider 126 of FIG. 1. The state propagation provider 126 of FIG. 1 attaches an NSK service object 512 to the CIM disk drive 506, via an NSK ME to service object 510. The state propagation provider then uses the process described below to find the parent objects for this disk drive (the computer chassis) and creates NSK service objects 512 for them also. In other words, if an error or failure occurs on a CIM managed element 202 of FIG. 2, such as a cooling fan, the error is propagated up the tree so that the parent(s) of the element are also shown as being in an error state.

Otherwise, if the tree were collapsed so that only the higher-level object (a server in this case) was visible, it would be difficult to realize there was a fault on a subcomponent until its parent also failed. In large, complex networks with thousands of managed elements, this could be a real problem. However, the dynamic tree structure of the present invention with dynamic state propagation moves error conditions up the tree so that a problem with a child node is also reflected on its parent's node. As a practical matter, this means that when a user is looking at an enterprise management screen on their computer, and there is a failure on a cooling fan in one of the managed servers, there will be a notification of some kind, such as a red "X", next to both the cooling fan and the server, as well as anything else related to the cooling fan.

Figure 6:
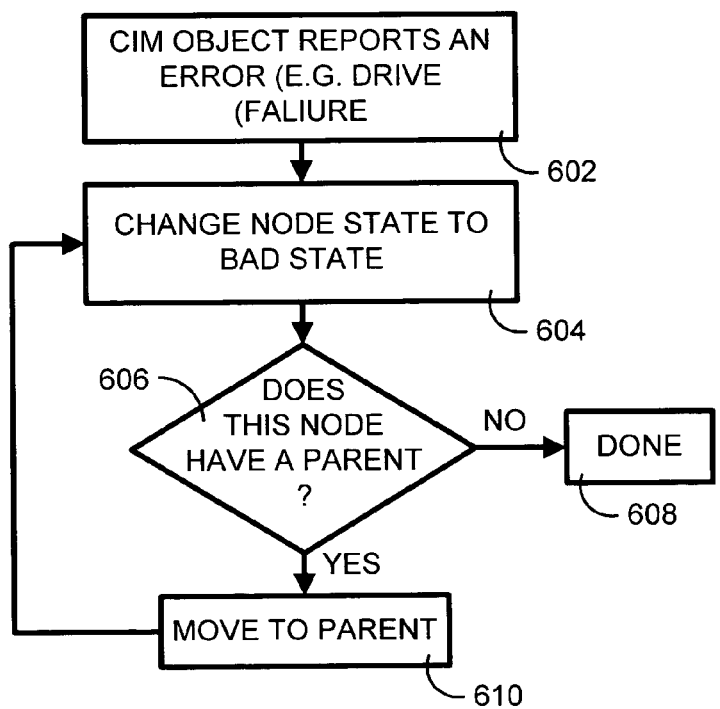
FIG. 6 is a high level flow chart of one embodiment of the dynamic state propagation method in the CIM environment.

FIG. 6 is a high level flow chart of one embodiment of the dynamic state propagation method in the CIM environment. As an example, FIG. 6 shows the CIM object reporting an error, such as a drive failure (step 602). When this happens, a warning is created to associate it with the failed node (step 604). Next, a determination is made to see if the failed node has a parent node (step 606). If not, then the process is done and the flag stays with the failed node (step 608). If however the failed node has a parent node, the process moves to the parent node and creates a flag (step 610). The process returns to step 604 and continues until all nodes associated with the failed node are found and flagged.

Figure 7:
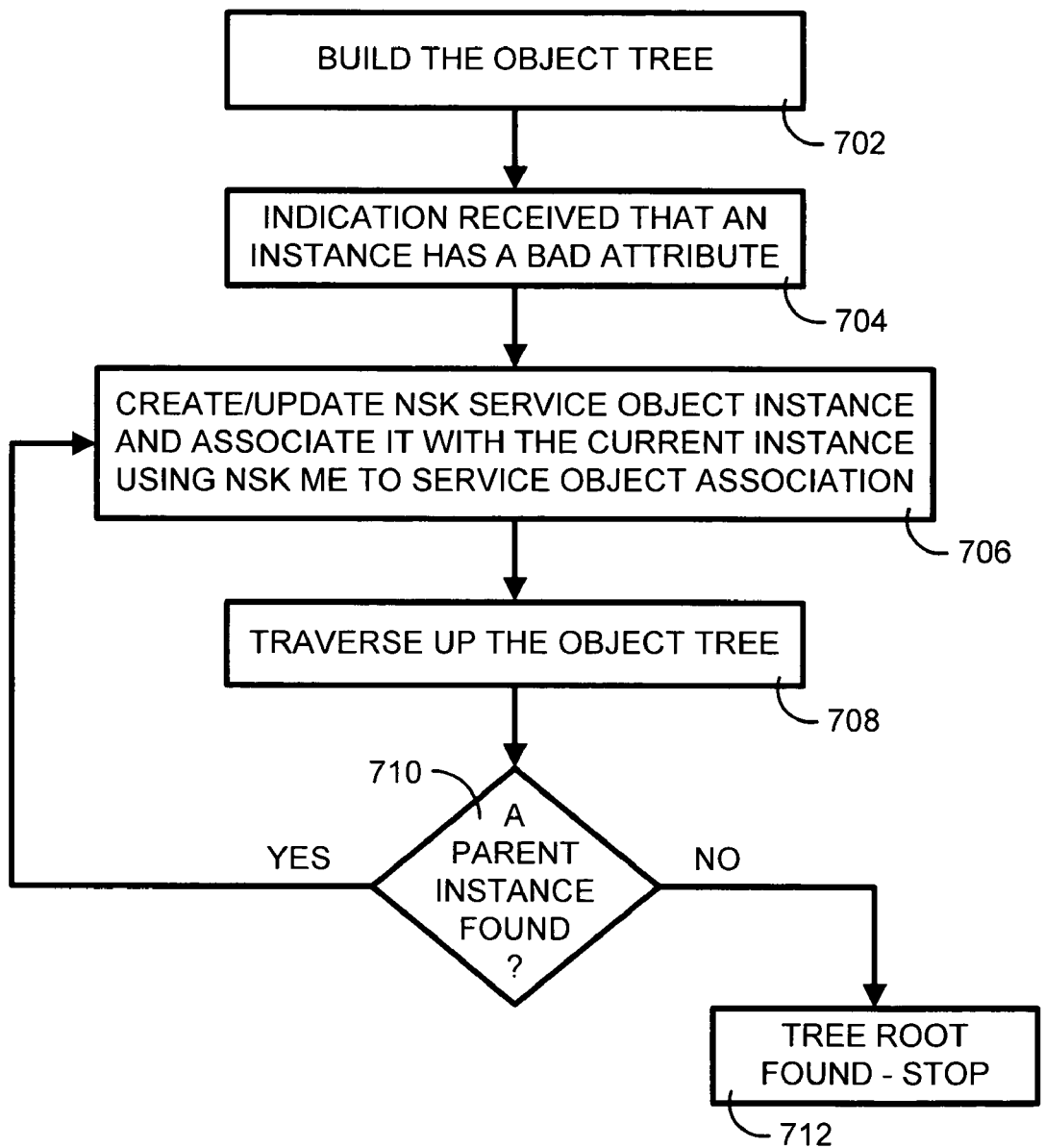
FIG. 7 is a detailed flow chart of one embodiment of the dynamic state propagation method in the CIM environment of the present invention.

FIG. 7 is a detailed flow chart of one embodiment of the dynamic state propagation method in the CIM environment of the present invention. The state propagation provider 126 of FIG. 1 uses dynamic state propagation to efficiently alert the user of errors. First, the object tree is built (step 702). If there is an indication that one of the objects, such as the disk drive, has a bad attribute or an error (step 704), the provider creates an NSK service object and associates it with the object that has the error (step 706). The state propagation provider 126 of FIG. 1 then enters a loop where it traverses up the object tree from the starting object (step 708). A determination is then made to determine whether a parent instance is found (step 710). If the process finds a parent object to the first object, the provider creates an NSK service object for it also. Next, the process examines the particular object's parents and so on up the tree by returning to step 708. When the state propagation provider comes to a node that has no parent, the process assumes that it is at the root of the tree, so it can stop traversing (step 712).

Figure 8:
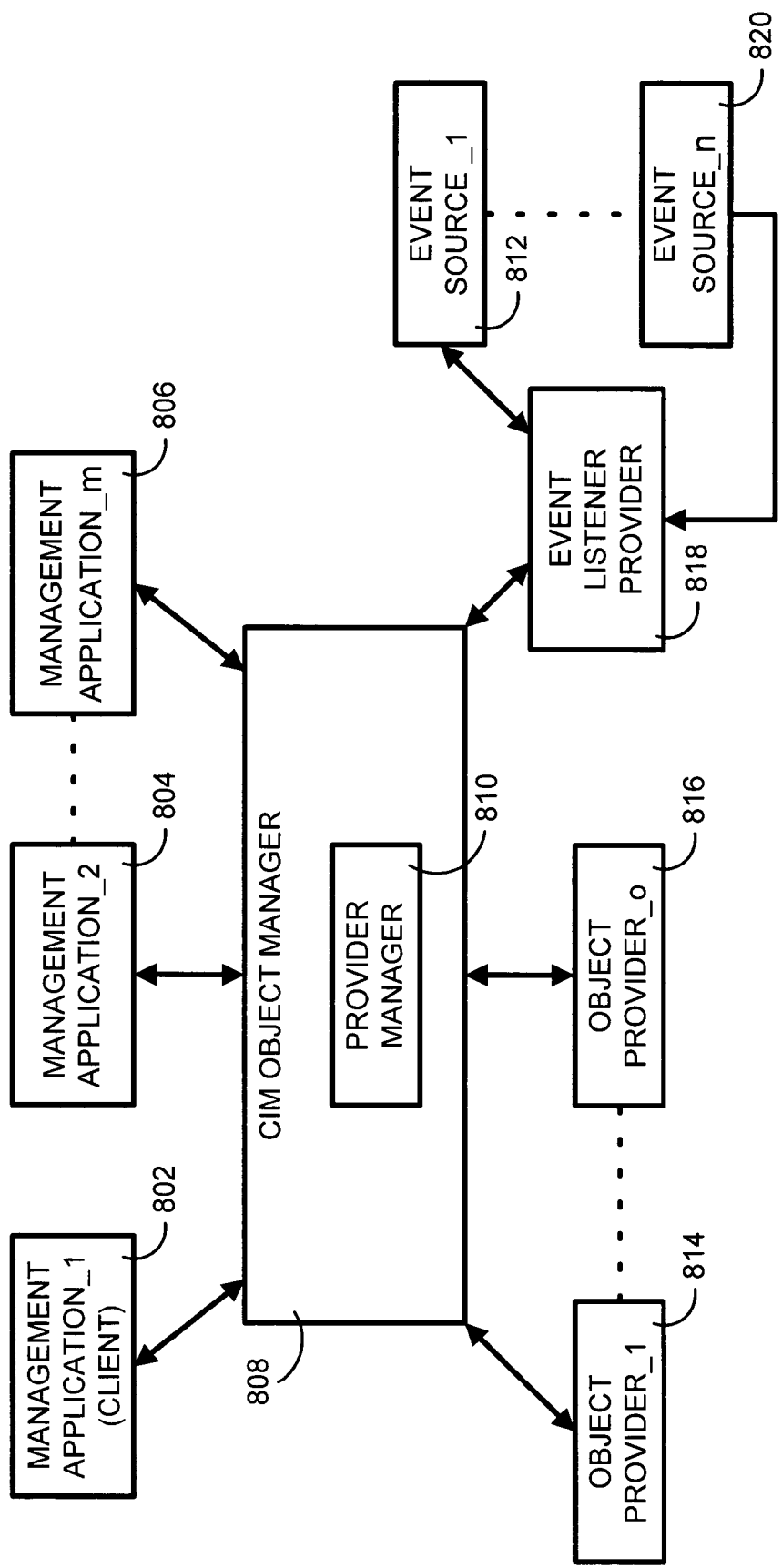
FIG. 8 illustrates one embodiment of the event registration query language methods of the present invention using Common Information Model ("CIM").

V. Event Registration Overview:

FIG. 8 illustrates one embodiment of the event registration query language methods of the present invention using Common Information Model ("CIM"). FIG. 8 shows the relationships between objects involved with event registration using a specialized query language. There can be any number of management applications 802, 804, 806 and any number of object providers 814, 816 that communicate with each other and an event listener 818 through a CIM Object manager (CIMOM) 808, similar to CIMOM 108 of FIG. 1. The object providers 814, 816 are managed by the provider manager subcomponent 810 of the CIMOM 808.

In general, the process through which client applications, such as management applications 802, 804, 806 can inform the CIMOM 808 that they are interested in knowing about particular problems with particular CIM objects (hardware, databases, components, etc.), is herein referred to as event registration. The management application clients 802, 804, 806 register with the CIMOM 808 and request information when an error occurs on a device, such as a read error on a disk drive, for example. In particular, the event listener provider 818 receives status and error messages from event sources 812, 820. These messages are then sent to the appropriate management applications 802, 804, 806 controlling corresponding devices that possibly failed. The event sources can also be object providers themselves.

In previous systems, typical event registration in CIM models allow only very basic registration requests, such as determining when a fan on a processor is too hot. Although this is useful, without inconvenient hard-coded programming into a client application, current CIM environments do not allow client applications to make more sophisticated requests. However, in one embodiment of the present invention, sophisticated requests can be produced. For example, some types of requests include determining if the temperature of a fan has increased by more than 10 degrees in the last minute and whether the temperature of a disk drive has also been increasing over the last 10 minutes. These types of sophisticated requests allow management applications to eliminate false alarms and transient errors. In addition, with this system, a client application is capable of displaying graphical statistics, such as a bar graph, of cooling fan temperatures for a user to easily view, without recording a particular event over a period of time.

In one embodiment of the present invention, the CIM environment has been extended with an event registration query language that allows client management applications 802, 804, 806 to register requests for notification of very complex combinations of events that might occur in the various CIM objects 814, 816, 818 that are in communication with the CIMOM 808. The event registration query language of the present invention can be implemented in any suitable manner. For example, in one embodiment, the event registration system includes an event listener provider 818 configured to communicate with the CIMOM 808 and the client management applications 802, 804, 806 for registering events.

In this example, a client management application 802 would submit an event registration query (or request) to the event listener provider 818 using any suitable programming language, such as extensible mark-up language (XML) messages. The event listener provider 818 then examines the system until the requested combinations of events occur and then notifies the client management application 802 of the occurrence of the event. This technique allows removal of filtering and monitoring logic from the client management applications 802, 804, 806 for centralizing it in a dedicated general purpose monitoring system that can be configured with the event registration query language to allow reporting on any of an enormous combination of different events.

In this embodiment, the event registration query language takes the form of an XML message sent to the event listener provider 818. As such, XML schema can be created for the query language to provide a great deal of specificity in selecting events to be notified of during monitoring. In addition, parameters of the event registration query language can be optional, which makes it useful for basic requests as well. Below is a simplified example of a high level conceptual view of how the event registration query language works. Although the full language can be as sophisticated as desired with feature richness, the below is shown for simplistic purposes.

For instance, if a client management application wants to be notified about a cooling fan and whether its temperature has increased by 10 degrees in 1 minute, and whether or not the disk drive temperature has also increased over 10 minutes, but nothing else, the following XML message could be sent as shown below in TABLE 1:

TABLE 1

```
<EVENTREGISTRATION>
    <TELLMEABOUT>
        <COOLINGFAN>
            <TEMP>Up by 10 degrees</TEMP>
            <SINCE>1 minutes ago</SINCE>
        </COOLINGFAN>
        <DISKDRIVE>
            <TEMP>Has been increasing</TEMP>
            <SINCE>10 minutes ago</SINCE>
        </DISKDRIVE>
    </TELLMEABOUT>
    <DONTTELLMEABOUT>Everything Else
    </DONTTELLMEABOUT>
</EVENTREGISTRATION>
```

In this example, the client management application 802 would send the above XML message to the event listener provider 818 asking it to start watching the cooling fan and the disk drive CIM objects. If both conditions above are met, then the event listener provider 818 would send an alert message back to the client management application 802 to let it know that something has gone wrong. In this example, the event listener provider 818 would not send any other messages to the client management application 802 since it specifically asked not to be told about them.

Moreover, referring to FIG. 8, as the event listener provider 818 receives status and error messages from event sources 812, 820, in one embodiment, XML code can be used to control certain functions, such as filtering, collection and thresholding (discussed in detail below with reference to FIGS. 10-11) of events. This would allow these functions to be located in the event listener provider 818, rather than having to relocate to each of the other components. As such, the management applications 802, 804, 806 and the object providers 814, 816 do not need to have specific logic that deals with thresholding, collection or filtering, since the event listener provider 818 would handle these functions.

Also, in this embodiment, the event listener provider 818 does not need to know all of the details of the messages it receives. The event listener provider 818 would need to know how to sort and filter the messages for forwarding them to the appropriate management application. The registration request that the particular management application uses to tell the event listener provider 818 what it wants to be notified of has many optional parameters which allow very complex and specific requests to be made. By omitting some optional parameters, the management applications can make simpler requests.

Figure 9:
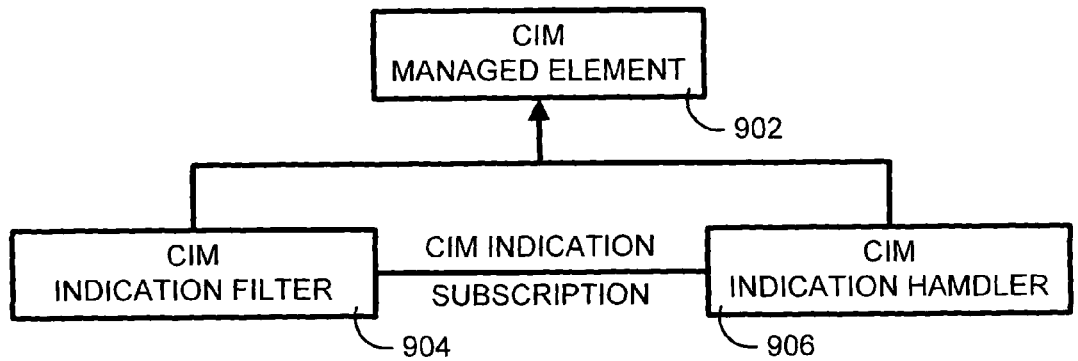
FIG. 9 illustrates one embodiment of the classes used for the event registration query language methods of the CIM environment of the present invention.

VI. Event Registration Component and Operational Details:

FIG. 9 illustrates one embodiment of the classes used for the event registration query language methods of the CIM environment of the present invention. FIG. 9 shows the relationship of the various classes used in the event registration query language. For example, a management application registers for an event indication by creating an instance of CIM indication filter 904 for filtering events and an instance of CIM indication handler 906. The CIM indication filter 904 indicates the event registration conditions and the CIM indication handler 906 indicates the "address" of the management application (e.g., IP address) to where the indication is to be sent to. Both CIM indication filter 904 and CIM indication handler 906 are derived from CIM managed element 902, which is the base class in CIM environment.

Figure 10:
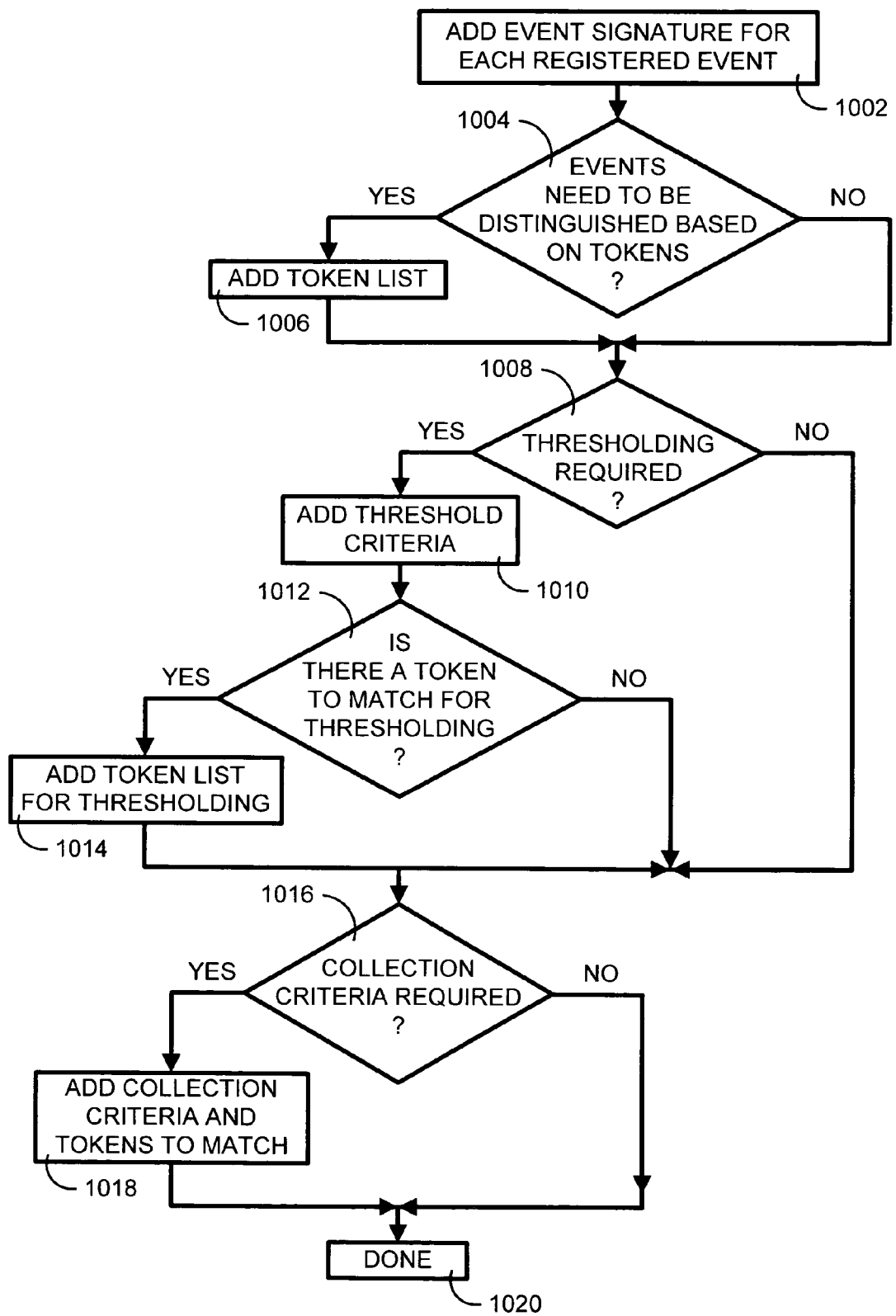
FIG. 10 is a detailed flow chart of one embodiment of the event registration query language methods in the CIM environment of the present invention.

FIG. 10 is a detailed flow chart of one embodiment of the event registration query language methods in the CIM environment of the present invention. FIG. 10 shows a flowchart of the actions that a management application 802 of FIG. 8 performs when it registers to receive event notifications. In this embodiment, an XML message is used that contains XML elements that make up the event registration query language.

Referring to FIG. 10 along with FIG. 8, first, every new event registration is added to the list of events that the management application 802 is interested in (step 1002). The management application 802 then determines whether the event needs to be distinguished based on the presence of specific predefined values, such as specific tokens (step 1004). If so, then the tokens are added to the record for the event registration that was created earlier (step 1006). If there are no tokens needed or the tokens have already been added, then the management application 802 determines whether any thresholding is needed for the event (step 1008). Thresholding tells the event listener that it should only forward messages that are above a specified limit or threshold.

If the event thresholding is needed, thresholding parameters are added now (step 1010). Next, a determination is made to find out if certain tokens should be matched for thresholding (step 1012). If so, they are added now (step 1014). If not, the event registration query may also contain parameters that tell the even listener provider 818 to collect data and store it until collection criteria are met, which can include any defined collection attributes, such as types of errors and the frequency of an error. If collection is required (step 1016), collection parameters are added at this point (step 1018). At the end of this process, the entire event registration query message has been built by the management application 802 (step 1002). This message is sent to the event listener provider 818 which parses the message to determine the list of events that the listener will be watching.

Figure 11:
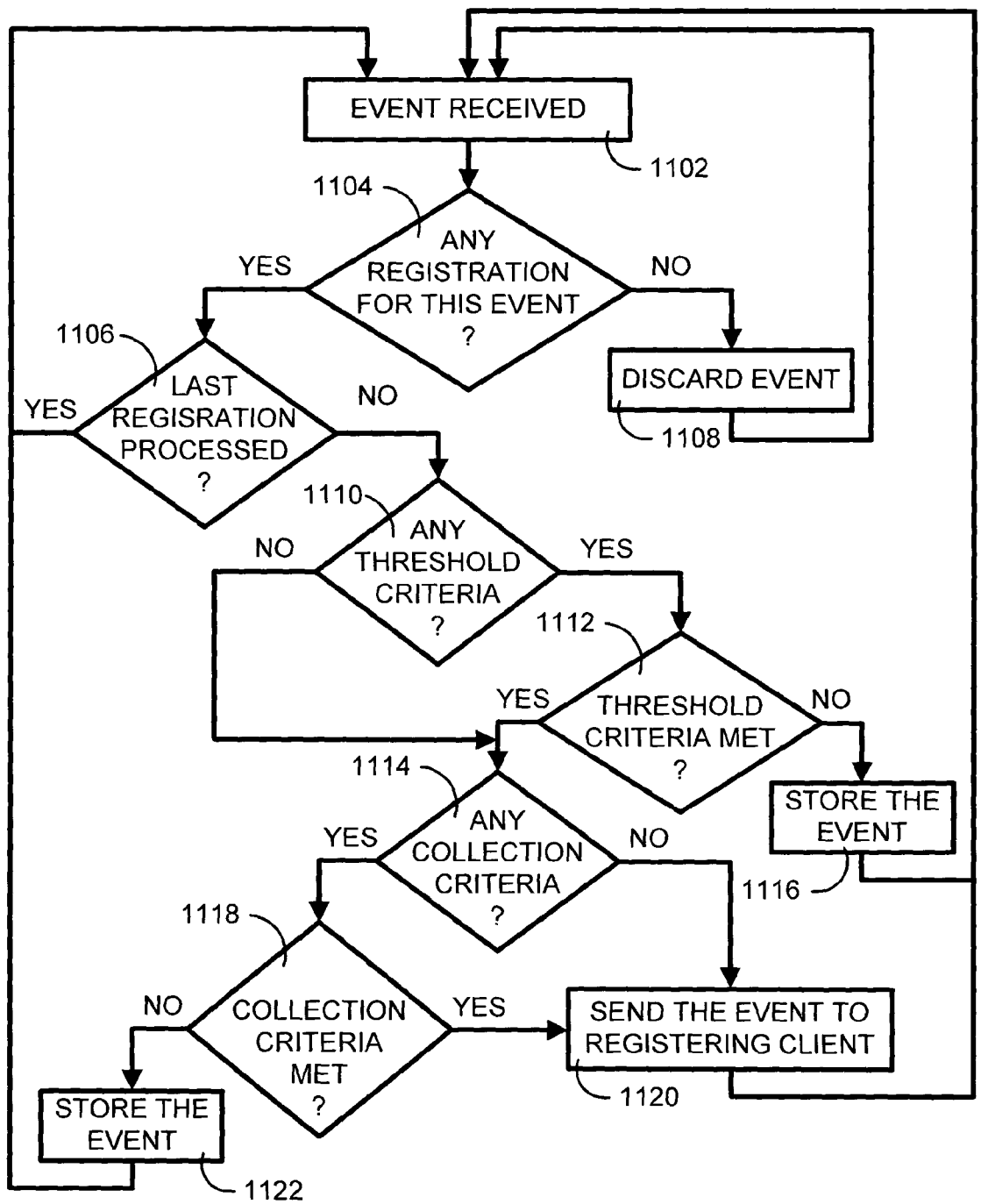
FIG. 11 is a detailed flow chart of one embodiment of the event listener of the event registration query language in the CIM environment of the present invention.

FIG. 11 is a detailed flow chart of one embodiment of the event listener of the event registration query language in the CIM environment of the present invention. FIG. 11 shows a flow chart for how the event listener provider 818 of FIG. 8 functions. In addition to simple error reporting (i.e. the cooling fan is too hot), the event listener provider 818 also supports data collection and thresholding. Data collection refers to collecting data from the object providers rather than, or in addition to, simply forwarding the events. For example the event listener provider 818 can store a record of each time an error occurs on a processor but not report them to the management application until one of the specified processes has failed too. The thresholding capability refers to the event listener provider 818 being able to look at error reports and determine the level of severity of the reports as specified by the object provider. Events or errors that are under the threshold set by the management application via the event registration query language are simply stored by the event listener provider 818 and not forwarded immediately to the management application until the threshold criteria are met. An example of threshold criteria would be "notify only if the failure occurs on the same disk drive for at least 10 times in 10 minutes". An example of collection criteria would be "notify only if the failure occurs on the same disk drive for at least 10 times in 10 minutes, and a failure also occurs on the mirror disk drive".

FIG. 11 shows that when an event is received by the event listener provider 818 (step 1102), such as a message from a disk drive, it checks to see if any of the management applications have registered for notification about this event (step 1104). If none of the 1 to M instances of the management application wants to know about the disk drive, then the event is discarded and the event listener provider 818 goes back to listening for events (step 1108). If there are registrations for this event, then the event listener provider 818 goes through each registration and applies the following rules until it has processed the last registration for the event and then it returns to waiting for events (step 1106).

The rules that are followed for each event registration include determining whether the registration specifies a threshold (step 1110). If it does, then it is determined whether the threshold criteria are met (step 1112). If they are not met, then the event is stored (step 1116) and the event listener provider 818 continues to listen and wait for more events. In other words, if the management application wants to know after 10 occurrences, it checks to see if 10 occurrences happened, if not, the event is stored so that the next time the process will be one event closer to the threshold criteria which the management application specified.

If there are threshold criteria that are met, then it is determined whether there are also collection criteria (step 1114). If there are no collection criteria for this event, but it is over the threshold, then an event notification is sent to the management application that registered the request (step 1120). If the threshold criteria are met and there are collection criteria, then it is determined whether the criteria are met (step 1118). If so, then the notification is sent to the management application (step 1120). Otherwise, the event is stored (step 1122). In other words, if the management application wants to know after 10 occurrences of one failure and 5 occurrences of another failure, it checks to see if 10 occurrences of one failure and 5 occurrences of the other failure happened, if not, the event is stored so that the next time the process will be one event closer to the collection criteria which the management application specified.

The event listener provider 818 runs through this process constantly checking for messages and applying the above logic to decide whether it should discard a message, store it for future use, check to see if it has happened enough times to be of concern, or forward it immediately to the management application. The thresholding and collection criteria are optional parameters for the event listener provider 818 so that a management application instance can use them if it wants to know about the occurrence of a very specific sort of error. It can also omit them as parameters in which case it would receive notification every time the event occurs regardless of frequency or severity and without having to specify very low or "dummy" thresholds and criteria. The event registration query language of the present invention in this embodiment supports multiple thresholds and collection criteria per event so that queries can become quite sophisticated and complex if needed, but can also be left to be very simple.

Figure 12:
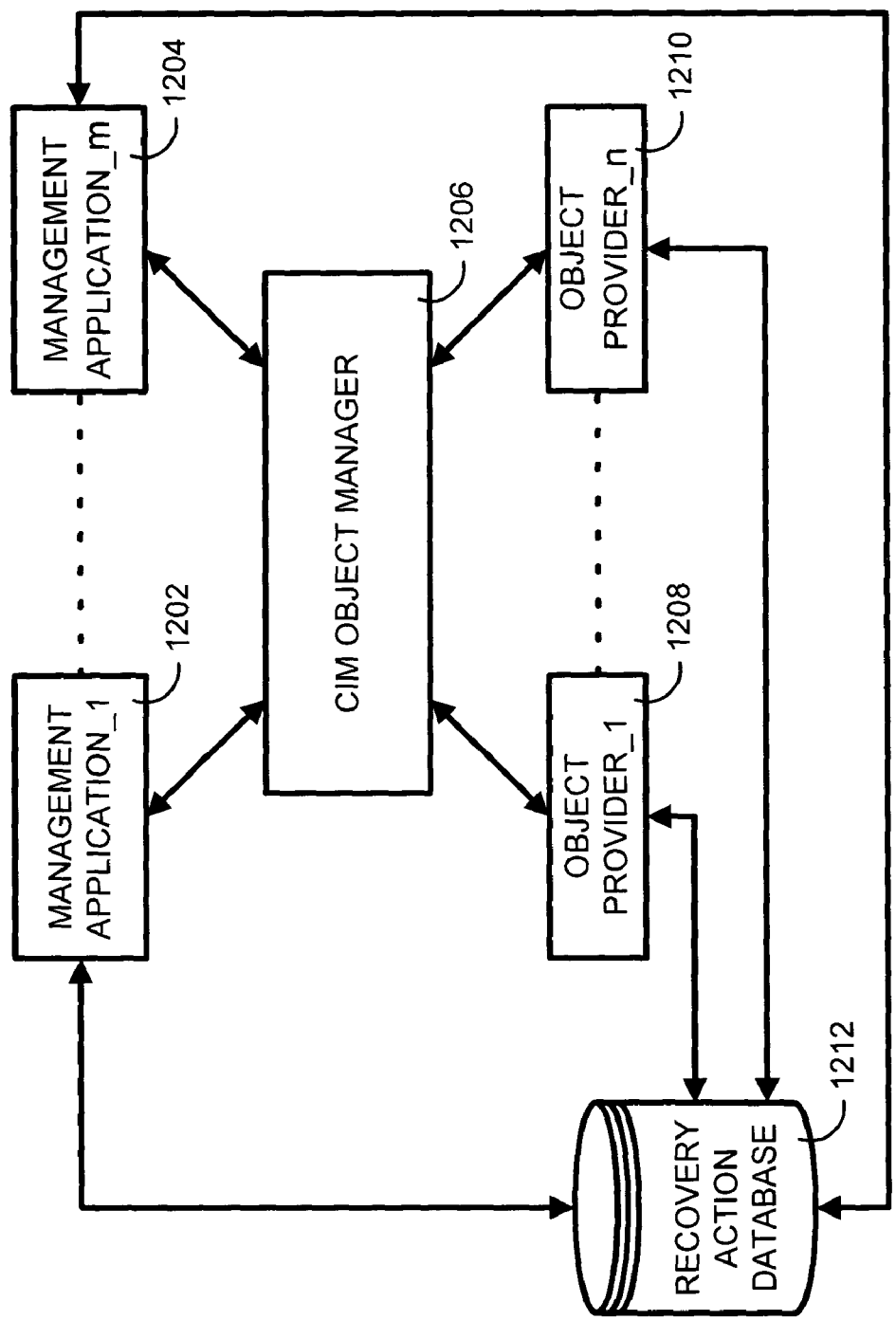
FIG. 12 illustrates one embodiment of the recovery actions of the present invention using Common Information Model ("CIM").

VII. Recovery Actions Overview:

FIG. 12 illustrates one embodiment of the recovery actions of the present invention using a CIM environment. In general, there can be any number of client management applications 1202, 1204 and any number of object providers 1208, 1210. In addition to indicating errors, the management applications 1202, 1204 communicating with the object providers 1208, 1210 through CIMOM 1206 are capable of also suggesting a course of action for the user to correct the error or problem. Context sensitive recovery actions of FIG. 12 provide a method by which a CIM object that is reporting a problem can also send a link to a record in a recovery action database 1212 that describes the error or problem in more detail and offers suggestions, hyperlinked pictures, etc. to assist in correcting the error or problem. The link is sent together with the dynamic data so that the user trying to fix the problem gets the dynamic information pertaining specifically to the error that occurred. The database 1212 contains static information.

In particular, a recovery actions database 1212 stores possible recovery actions with embedded substitutable text and other objects. A recovery action is an instruction or suggestion for the user on how to correct an error or problem. A recovery action can be a simple one-line solution or a complex multi-step process with hyperlinks and pictures. The database can contain text descriptions for operators to follow to resolve the errors or problems after they have been filtered, thresholded, or collected by the event listener provider 818 of FIG. 8.

The recovery action database 1212 can be keyed on a unique index so that each recovery action can by uniquely identified. The object providers 1208, 1210 send this index value to the management applications 1202, 1204 along with variable text which is substituted in specific places in the static recovery action stored in the database. For example, if a disk drive RAID array reported a failure of a disk drive, a message could be sent such as "1023, disk drive #2 is in west building". A management application would go to the database and retrieve record #1023, parse it, and substitute the "disk drive #2 is west building" in predefined locations in the text. This allows the management application to provide the user with an intelligent and context sensitive message based on a template. An identical failure on a different disk drive would produce the same message except with different descriptive text to be substituted since the recovery actions would be the same and only the description of the device would differ.

As another example, if a hardware device needs to be replaced, the recovery actions could direct the user to a specific point, such as "module 1 in rack 2, at offset 5". The context sensitive recovery actions of this embodiment of the present invention also provides a way to define choice of actions in the static database based on the dynamic data provided by the provider. For example, the static recovery action can specify two different sets of steps for replacing a disk drive as opposed to replacing a fan. The user would see only the correct set of steps, based on the information provided by the provider whether the component to be replaced is a disk drive or a fan. The context sensitive recovery actions of this embodiment of the present invention can use any suitable programming language for delivering messages. For example, simple XML messages can be used in the recovery action database and by the provider to supply the substitutable text in the recovery actions. Thus, the database preferably stores static information with portions that can be substituted and selected. A particular object provider then supplies a link to the database in additional to the real values of the selectable data (which can be text, pictures, sound or any other media).

In one embodiment, when the client management application 1202 retrieves a record in the database 1212, it can be formatted with HTML, and the values supplied by the object provider 1208 can be used to select the content and substitute the values before it displays the recovery actions to the user. This provides a user an idea of how to proceed with fixing the problem by using simple HTML formatting. In addition, in this example above, the system might also suggest that the user check/replace the cooling fan at a particular rack location, and show step-by-step instruction on how to perform the action using a preconfigured HTML template.

Figure 13:
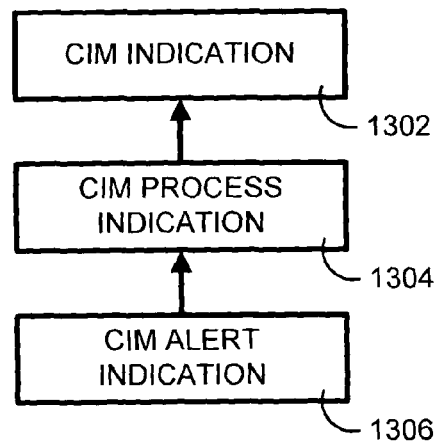
FIG. 13 illustrates one embodiment of the classes used for the recovery actions of the CIM environment of the present invention.

VIII. Recovery Actions Component and Operational Details:

FIG. 13 illustrates one embodiment of the classes used for the recovery actions of the CIM environment of this embodiment of the present invention. FIG. 13 shows the relationship of the classes that are used in the recovery actions data base 1212 of FIG. 12. A CIM indication 1302 class is the base class in the CIM model for any indication. A CIM process indication 1304 is a specific class to indicate process changes in the CIM model. A CIM alert indication 1306 is yet another specific class to indicate alert conditions. The reference identification number and variable text described above are attached to the CIM alert indication 1306 when the CIM alert indication is sent by an object provider 1208 of FIG. 12.

Figure 14:
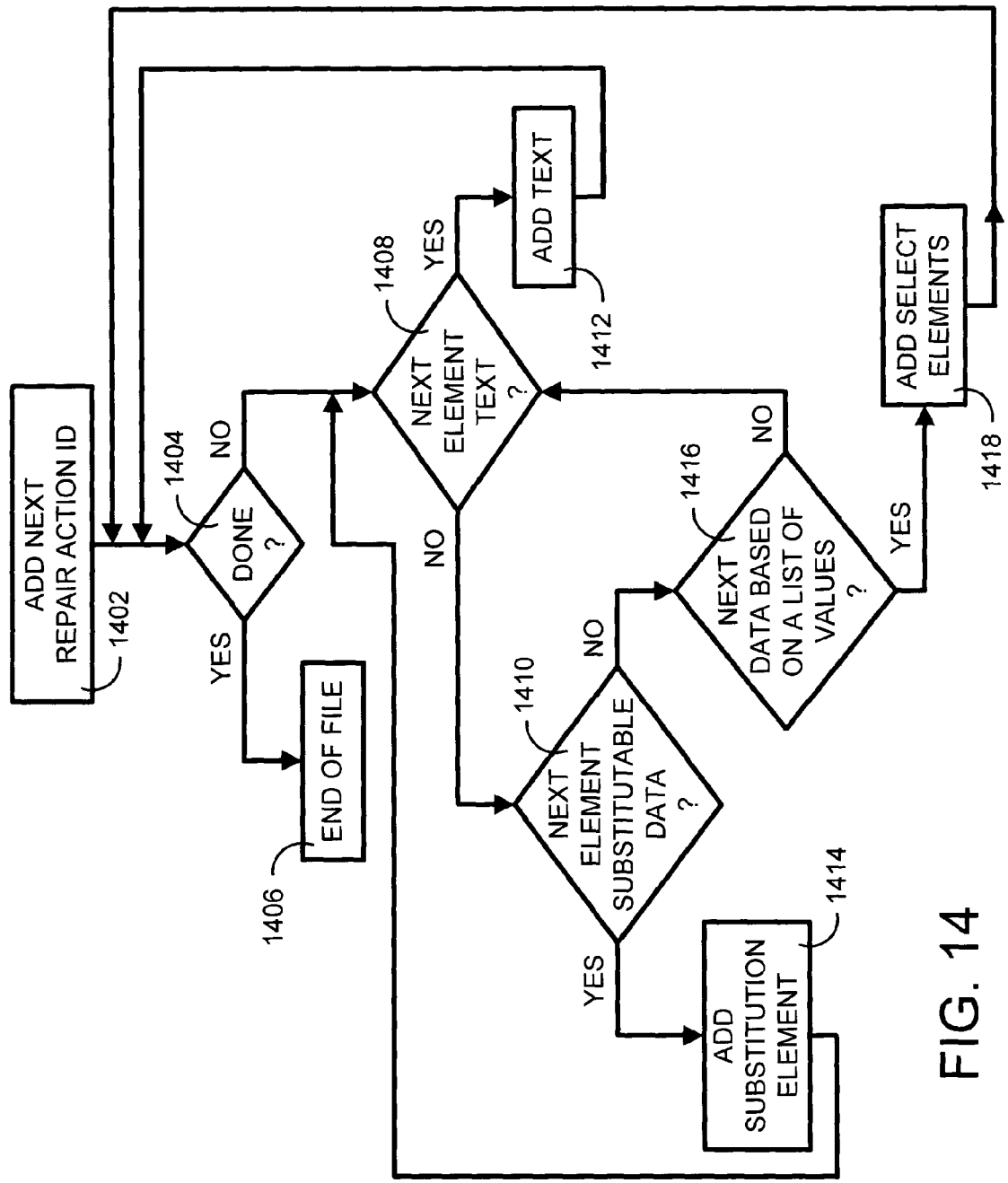
FIG. 14 is a flow chart of one embodiment of writing recovery actions in the CIM environment of the present invention.

FIG. 14 is a flow chart of one embodiment of writing recovery actions in the CIM environment of the present invention. FIG. 14 shows the process of populating the recovery action database with the static recovery actions. The process begins by adding a unique repair action identification (id) to the database (step 1402). This id allows both the object providers and management applications to reference and retrieve the recovery action later. When all the recovery actions have been added (step 1404), the recovery action database is completely populated (step 1406). While building a record, the process looks at each element to see if it's text, substitutable data, or a selectable element to add the correct tag into the database.

If the element in question is text, it is added to the record already created (step 1408, 1412) and the process loops back to analyze more data (step 1404). If the element is not text, the process checks to see if it is substitutable data that will be used to make the recovery action context sensitive (step 1410). An example of substitutable data would be a tag that indicates the specific object that has failed or other variable text that will be inserted into the recovery action based on the value provided by the object provider so that the message to the user is more descriptive than a simple generic set of instructions would be. If substitutable data is needed, the process inserts the substitution element (step 1414) and goes back to process more data (step 1408). If the element isn't plain text and it isn't substitutable data, the process determines that it might be selectable data that can be used to select specific recovery actions from a list of possibilities, based on the value provided by the object provider. If a select element is found it is also added to the recovery action record (steps 1416, 1418) and control passes to the top of the process at step 1404 to continue with additional records.

Figure 15:
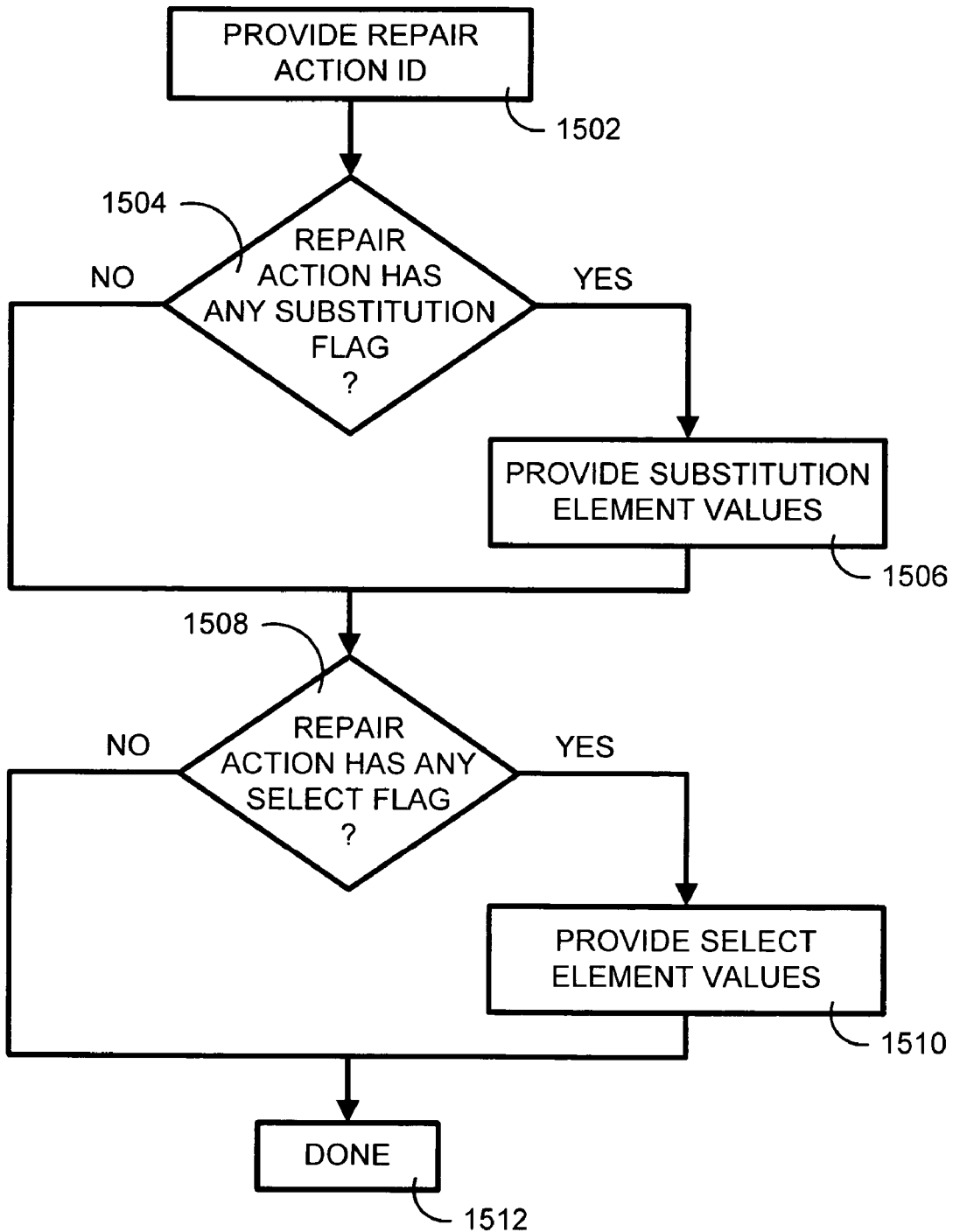
FIG. 15 is a flow chart of one embodiment of using recovery actions in the CIM environment of the present invention.

FIG. 15 is a flow chart of one embodiment of using recovery actions in the CIM environment of the present invention. FIG. 15 shows a process that the object provider goes through prior to sending the CIM alert indication message 1302 of FIG. 13 described above to the management application 1202. In essence, it's the mirror image of what the management application 1202 goes through to reconstruct the recovery actions text based on what the provider 1208 sends. As such, the object provider 1208 provides the unique id of the recovery action for the particular error into the database 1212 (step 1502). If the recovery action requires a substitution value (step 1504), then the object provider 1208 includes them in the message (step 1506). If the recovery action has any select flags, then the object provider 1208 also provides them in the CIM alert indication message 1306 that is to be sent (steps 1508, 1510). This ensures that when the management application 1202 goes to fill in the blanks in the recovery actions document, it will have values to work with at that time.

Figure 16:
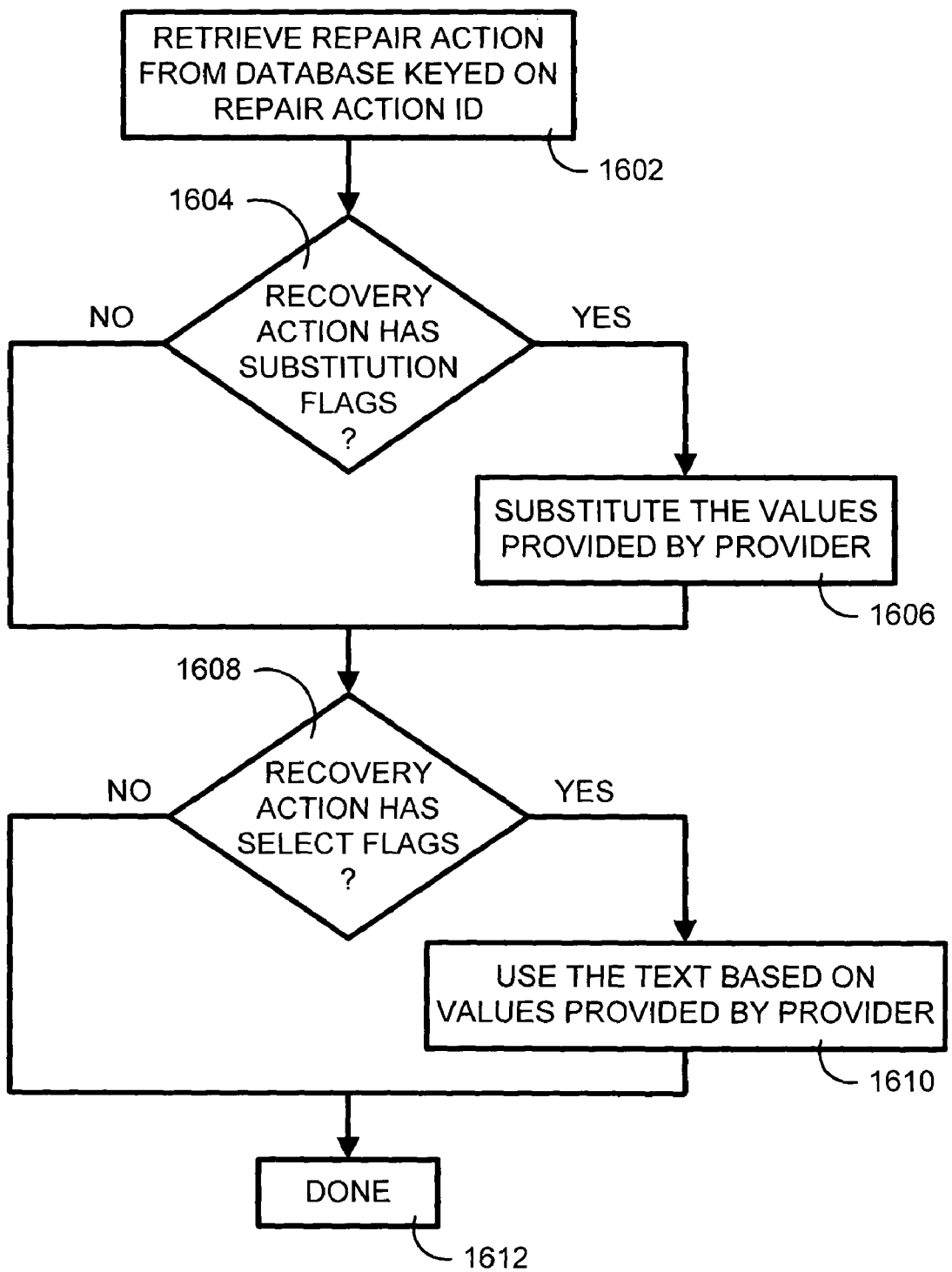
FIG. 16 is a flow chart of one embodiment of displaying recovery actions in the CIM environment of the present invention.

FIG. 16 is a flow chart of one embodiment of displaying recovery actions in the CIM environment of the present invention. FIG. 16 shows a process of how to display recovery actions. First, the management application 1202 receives a recovery action from the database 1212, based on the unique id provided by the object provider 1208 (step 1602). The process then parses the recovery action for locating special designated places in the text labeled substitution and select flags where the variable values passed in the message are to be used to build the actual recovery action to display to the user. The process first determines whether there are substitution flags found (step 1604). If so, the process then inserts the values from the object provider (step 1606). Whether substitution flags are found or not, the management application 1202 then checks for select flags (step 1608), which are similar to substitution flags, but they allow the object provider 1206 to either select particular text to show or not show, or select a particular set of text from multiple choices of text, in the recovery actions document. If any select flags are found, then the process uses whichever the object provider specified in its message (step 1610). When this is completed, the process is done (step 1612).

Although the embodiments described above were within the DMTF CIM environment, the present invention can be implemented with other embodiments in other management domains that do not use DMTF and CIM. Also, the foregoing has described the principles, embodiments and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

The invention claimed is:

1. A computer implemented method for managing entities in a computer system, comprising:
   relating the managed entities and sub-entities each with a node into a hierarchical tree structure having multiple levels and being defined in a common information model with a tree root and child associations;
   dynamically manipulating meta data representing properties of the hierarchical tree structure, the meta data defined in the common information model as a set of informational data;
   traversing the tree structure until the tree root and all of the child associations are encountered without knowledge of the structure of the individual nodes and without mapping between a document schema and a hierarchical database, wherein a tree level change is performed for every level in the tree until no child associations are found if the association is in a predefined list of child associations; and
   determining an origination of each managed entity based on the associations encountered for at least one of adding, deleting or revising information associated with the node for dynamically propagating a status of the managed entities of the hierarchical tree structure, wherein the hierarchical tree structure is generated dynamically by propagating the status to nodes that are associated with a child association until the root of the tree is found without associating any object with any configuration value and without having any knowledge of elements in the hierarchical tree structure.

2. The computer implemented method of claim 1, further comprising using the meta data to describe how, when and by what a particular set of data was collected and how the set of data is formatted.

3. The computer implemented method of claim 1, further comprising defining plural computer device objects, each associated with a managed entity.

4. The computer implemented method of claim 3, further comprising using a common information model object manager that communicates with a user interface to indicate errors of a particular computer device object associated with a particular managed entity.

5. The computer implemented method of claim 1, further comprising communicating with computer device objects that are running locally using at least one of inter-process communication (IPC) and hyper text transfer protocol (HTTP).

6. The computer implemented method of claim 1, further comprising communicating with computer device objects that are running remotely on other systems using at least one of inter-process communication (IPC) and hyper text transfer protocol (HTTP).

7. The computer implemented method of claim 1, further comprising using a repository interface configured to manage data elements and classes to implement routines for developing the hierarchical tree structure and dynamic propagation of it.

8. The computer implemented method of claim 1, further comprising providing a tree view user interface element as a common information model extension that defines a tree structure in terms of the tree root and the child associations.

9. The computer implemented method of claim 8, wherein the tree structure defined in terms of the tree root and the child associations are capable of resulting in a level change in the tree.

10. The computer implemented method of claim 9, further comprising defining plural tree structures predefined to specific applications so that the hierarchical tree structure is built with computer device objects that are traversed and dynamically manipulated without knowledge of any internal information about a platform the computer device objects are using.

11. The computer implemented method of claim 1, further comprising finding error conditions of a child node and dynamically moving each error condition up the hierarchical tree structure to allow the error of the child node to be reflected on its respective parent's node.

12. A computer system operating in a common information model environment having computer device objects associated with managed entities controlled by a computer implemented software object manager operating in the computer system, comprising:
a processor; a memory;
a hierarchical tree structure building module that relates the managed entities and sub-entities each with a node into a hierarchical tree structure having a tree root and child associations with multiple levels;
a common information model object manager that communicates with a user interface for indicating errors of a particular computer device object;
hierarchical tree traversing module that traverses the tree structure until the tree root and all of the child associations are encountered without knowledge of the structure of the individual nodes and without mapping between a document schema and a hierarchical database, and dynamically manipulating meta data representing properties of the hierarchical tree structure, the meta data defined in the common information model as a set of informational data, wherein the hierarchical tree traversing module acquires a tree root instance for the tree to be traversed and starts following the child associations so that only the tree root and the child associations are specified and wherein a tree level change is performed for every level in the tree until no child associations are found if the association is in a predefined list of child associations; and
a state propagation module configured to dynamically propagate a status of each computer device object from its origination node to its parent node up the hierarchical tree structure, wherein all the associations that are not child associations refer to a sibling node so that there are no level changes in the tree when such an association is encountered and when a child association is encountered, a level change in the tree is made and wherein all the associations are made recursively until no more child associations are encountered for a node, which becomes a leaf node, and wherein the status is propagated to nodes that are associated with a child association until the root of the tree is found.

13. The computer system of claim 12, further comprising a communication module that communicates with the computer device objects that are running remotely using at least one of inter-process communication (IPC) and hyper text transfer protocol (HTTP).

14. The computer system of claim 12, wherein the state propagation module finds error conditions of child nodes and dynamically moves each error condition up the hierarchical tree structure to allow the error of the child node to be reflected on its respective parent's node.

15. The computer system of claim 12, further comprising a repository interface that manages data elements and classes for implementing routines to develop the hierarchical tree structure and to dynamically propagate it.

16. The computer system of claim 12, wherein the meta data describes how, when and by what a particular set of data was collected and how the set of data is formatted.

17. The computer system of claim 12, wherein the state propagation module propagates status information for each computer device object without knowledge of any internal information about a platform the computer device objects are using.

18. A computer system operating in a common information model environment for managing entities controlled by a computer implemented software object manager operating in the computer system, comprising:
a processor; a memory;
first computer software code controlled by the object manager for relating the managed entities and sub-entities each with a node into a hierarchical tree structure with a tree root and child associations having multiple levels;
second computer software code controlled by the object manager for traversing the tree structure until the tree root and all of the child associations are encountered;
third computer software code controlled by the object manager for determining an origination of each managed entity based on the associations encountered for at least one of adding, deleing or revising information associated with the node for dynamically propagating a status of the managed entities of the hierarchical tree structure without knowledge of the structure of the individual nodes and without mapping between a document schema and a hierarchical database, and dynamically manipulating meta data representing properties of the hierarchical tree structure, the meta data defined in the common information model as a set of informational data, wherein a tree level change is performed for every level in the tree until no child associations are found if the association is in a predefined list of child associations;

fourth computer software code controlled by the object manager for acquiring a tree root instance for the tree to be traversed by following the child associations so that only the tree root and the child associations are specified, wherein all the associations that are not child associations refer to a sibling node so that there are no level changes in the tree when such an association is encountered and when a child association is encountered, a level change in the tree is made and wherein all the associations are made recursively until no more child associations are encountered for a node, which becomes a leaf node by propagating the status to nodes that are associated with a child association until the root of the tree is found; and fifth computer software code controlled by the object manager for finding error conditions of a child node and dynamically moving each error condition up the hierarchical tree structure to allow the error of the child node to be reflected on its respective parent's node.

19. The computer system of claim 18, further comprising sixth computer software code controlled by the object manager for using the meta data, wherein the meta data that describes how, when and by what a particular set of data was collected and how the set of data is formatted.

20. The computer system of claim 18, further comprising seventh computer software code controlled by the object manager for defining plural computer device objects, each associated with a managed entity.

21. The computer system of claim 20, further comprising eighth computer software code controlled by the object manager for communicating with a user interface to indicate errors of a particular computer device object associated with a particular managed entity.

22. The computer system of claim 18, further comprising ninth computer software code controlled by the object manager for managing data elements and classes to implement routines for developing the hierarchical tree structure and for dynamically propagating it.

23. A computer system for managing computer devices of the system and including a computer implemented software object manager that controls the computer device and operates in the computer system, comprising:

a processor; a memory;

a hierarchical tree structure having multiple levels and being located in a common information model and defining the managed computer devices with a root and child associations that dictate level changes of the managed computer devices in the tree structure;

a tree builder module configured to obtain appropriate instances of the tree structure and the tree root and to traverse the child associations of the tree structure until all of the child associations are encountered, and dynamically manipulate meta data representing properties of the hierarchical tree structure, the meta data defined in the common information model as a set of informational data, wherein the tree builder module acquires a tree root instance for the tree to be traversed and starts following the child associations so that only the tree root and the child associations are specified without knowledge of the structure of the individual nodes and without mapping between a document schema and a hierarchical database, wherein a tree level change is performed for every level in the tree until no child associations are found if the association is in a predefined list of child associations; and an update module configured to analyze the tree builder module for dynamically updating a status of the hierarchical tree structure by determining an origination of a managed computer device defined by a node and adding, deleting or updating information associated with the node, wherein the hierarchical tree structure is generated dynamically without associating any object with any configuration value and without having any knowledge of elements in the hierarchical tree structure; and a state propagation module configured to perform automatic state propagation in the hierarchical tree structure without knowledge of details of managed objects and without defining state propagation detailed logic, wherein all the associations that are not child associations refer to a sibling node so that there are no level changes in the tree when such an association is encountered and when a child association is encountered, a level change in the tree is made and wherein all the associations are made recursively until no more child associations are encountered for a node, which becomes a leaf node by propagating the status to nodes that are associated with a child association until the root of the tree is found.

24. The computer system of claim 23, further comprising a tree view user interface element that defines the hierarchical tree structure in terms of the tree root and the child associations.

25. The computer system of claim 24, wherein the tree hierarchical structure defined in terms of the tree root and the child associations are capable of resulting in a level change in the tree.

26. The computer system of claim 25, wherein the plural tree structures are predefined to specific applications so that the hierarchical tree structure is built with computer device objects that are traversed and dynamically manipulated without knowledge of any internal information about a platform the computer device objects are using.

27. The computer system of claim 23, wherein the meta data is used to describe how, when and by what a particular set of data was collected and how the set of data is formatted.

28. The computer system of claim 23, wherein the hierarchical tree structure, the tree builder module and the update module are programmed to operate in a computer readable medium using computer operable instructions.

* * * * *

UNITED STATES PATENT AND TRADEMARK OFFICE
CERTIFICATE OF CORRECTION

| | | |
|---|---|---|
| PATENT NO. | : 7,860,838 B2 | Page 1 of 1 |
| APPLICATION NO. | : 10/860943 | |
| DATED | : December 28, 2010 | |
| INVENTOR(S) | : Vinay Gupta et al. | |

It is certified that error appears in the above-identified patent and that said Letters Patent is hereby corrected as shown below:

In column 15, line 63, in Claim 12, before "hierarchical" insert -- a --.

In column 16, line 62, in Claim 18, delete "deleing" and insert -- deleting --, therefor.

Signed and Sealed this

Thirty-first Day of May, 2011

David J. Kappos
*Director of the United States Patent and Trademark Office*